United States Patent
Lee et al.

(10) Patent No.: US 12,331,174 B2
(45) Date of Patent: Jun. 17, 2025

(54) LAMINATED POLYESTER FILM

(71) Applicant: TORAY ADVANCED MATERIALS KOREA INC., Gumi-si (KR)

(72) Inventors: Seung Hwan Lee, Gumi-si (KR); Young Ho Kim, Gumi-si (KR); Jae Hoon Kim, Gumi-si (KR); Jae Hee Seong, Gumi-si (KR)

(73) Assignee: TORAY ADVANCED MATERIALS KOREA INC., Gumi-si (KR)

( * ) Notice: Subject to any disclaimer, the term of this patent is extended or adjusted under 35 U.S.C. 154(b) by 214 days.

(21) Appl. No.: 18/013,372

(22) PCT Filed: Apr. 20, 2021

(86) PCT No.: PCT/KR2021/004921
§ 371 (c)(1),
(2) Date: Dec. 29, 2022

(87) PCT Pub. No.: WO2022/010076
PCT Pub. Date: Jan. 13, 2022

(65) Prior Publication Data
US 2023/0340215 A1    Oct. 26, 2023

(30) Foreign Application Priority Data
Jul. 6, 2020    (KR) .................. 10-2020-0082747

(51) Int. Cl.
*C08J 5/18* (2006.01)
*B32B 7/02* (2019.01)
(Continued)

(52) U.S. Cl.
CPC .................. *C08J 5/18* (2013.01); *B32B 7/02* (2013.01); *B32B 27/08* (2013.01); *B32B 27/18* (2013.01);
(Continued)

(58) Field of Classification Search
CPC .......... B32B 27/36; B32B 2264/00–2264/504
See application file for complete search history.

(56) References Cited

FOREIGN PATENT DOCUMENTS

| EP | 609060 A1 * | 8/1994 | ............. B32B 27/08 |
| EP | 786765 A2 * | 7/1997 | ............. B32B 27/08 |

(Continued)

OTHER PUBLICATIONS

Hyde et al. "Colloidal Silica Particle Synthesis and Future Industrial Manufacturing Pathways: A Review", Industrial & Engineering Chemical Research, vol. 55, Issue 33, (2016); pp. 8891-8913.*
International Written Opinion issued on Oct. 7, 2021 in counterpart Patent Application No. PCT/KR2021/004921 (4 pages in Korean).
Chinese Office Action issued on Apr. 3, 2024, in counterpart Chinese Patent Application No. 202180047384.0 (11 pages in English, 7 pages in Chinese).

(Continued)

*Primary Examiner* — Prashant J Khatri
(74) *Attorney, Agent, or Firm* — NSIP Law (57) ABSTRACT

A laminated polyester film according to the present invention comprises: a core layer; and a sub-layer laminated on at least one surface of the core layer and containing a first particle and a second particle which are different components, wherein an average diameter of the first particle is 6 to 20 times of an average diameter of the second particle. Types, different properties, sizes, and contents of the first particle and the second particle are adjusted to solve the image blurring phenomenon and prevent a winding fault generated during processing and winding a final product. Therefore, workability and perfection of a final product can be increased and the defect rate can be decreased.

11 Claims, 1 Drawing Sheet

(51) Int. Cl.
  *B32B 27/08* (2006.01)
  *B32B 27/18* (2006.01)
  *B32B 27/36* (2006.01)
  *C08K 3/26* (2006.01)
  *C08K 3/36* (2006.01)

(52) U.S. Cl.
  CPC ............... *B32B 27/36* (2013.01); *C08K 3/26* (2013.01); *C08K 3/36* (2013.01); *B32B 2250/03* (2013.01); *B32B 2250/244* (2013.01); *B32B 2264/1021* (2020.08); *B32B 2264/104* (2013.01); *B32B 2264/302* (2020.08); *B32B 2307/414* (2013.01); *B32B 2307/518* (2013.01); *B32B 2307/7376* (2023.05); *C08J 2367/02* (2013.01); *C08K 2003/265* (2013.01); *C08K 2201/005* (2013.01)

(56) References Cited

FOREIGN PATENT DOCUMENTS

| | | |
|---|---|---|
| JP | 2005-7743 A | 1/2005 |
| KR | 10-0185609 B1 | 4/1999 |
| KR | 10-1999-0071218 A | 9/1999 |
| KR | 10-0218866 B1 | 9/1999 |
| KR | 10-2016-0038438 A | 4/2016 |
| KR | 10-2019-0071115 A | 6/2019 |
| KR | 10-2019-0130968 A | 11/2019 |
| WO | WO-9601739 A1 * | 1/1996 ............ B32B 27/20 |

OTHER PUBLICATIONS

Malaysian Office Action issued on Aug. 23, 2024, in counterpart Malaysian Patent Application No. PI2022007481 (4 pages).

* cited by examiner

LAMINATED POLYESTER FILM

CROSS REFERENCE TO RELATED APPLICATIONS

This application is a U.S. National Stage Application of International Application No. PCT/KR2021/004921, filed on Apr. 20, 2021, which claims the benefit under 35 USC 119 (a) and 365(b) of Korean Patent Application No. 10-2020-0082747, filed on Jul. 6, 2020, in the Korean Intellectual Property Office, the entire disclosure of which is incorporated herein by reference for all purposes.

TECHNICAL FIELD

The present disclosure relates to a laminated polyester film, more particularly to a laminated polyester film excellent in running properties and winding properties while maintaining optical properties of the film by improving surface properties of the laminated polyester film.

BACKGROUND ART

A polyester film has excellent optical properties such as transparency and light resistance, and excellent moisture and chemical resistance, so it is used in a wide variety of products such as display films, window films, multilayer ceramic capacitor (MLCC) films, carrier films and packaging films. In particular, the polyester film is being applied to products requiring high optical properties, such as a film for a display and a film for a window, and thus a film with better optical properties is required for product differentiation.

In accordance with the demand for improving such optical properties, while lowering a haze of the polyester film, a film in which no grainy feeling is felt has been developed. As a method for improving the optical properties of the polyester film, a method of controlling a content and a particle size of inert particles added to the polyester film is used. In the case of reducing the size of the inert particles added to the polyester film and reducing the content of the particles in this way, a low haze can be achieved and the feeling of particles on the surface is excellent, but running properties and winding properties are deteriorated, so there is a limit to improving physical properties of the polyester film only by controlling the inert particles.

In addition, in applying the polyester film to various products, functional layers such as a primer layer, a hard coating layer, a deposition layer and a ceramic layer are treated on the surface of the polyester, but if reducing the content and size of inert particles, when the polyester film comes into contact with the surface of a functionally treated layer such as a primer layer, a hard coating layer, a deposition layer, and a ceramic layer, due to the small particle size and low content of the inert particles, it is difficult to process, and the winding properties after processing is insufficient, resulting in an increase in winding defects in which defects such as air pockets are generated on the surface.

DETAILED DESCRIPTION OF THE INVENTION

Technical Problem

The present disclosure is devised to meet the above demands and solve problems of the prior art, an object of the present disclosure is to provide a laminated polyester film having excellent winding properties due to excellent friction properties even after processing despite low roughness, by using inorganic particles having a refractive index similar to that of a polyester film in a certain ratio using a laminated structure to suppress the particle visibility of the particles optically visible inside, and by using particles with different components to improve dispersibility.

The above and another objects and advantages of the present disclosure will be more apparent from the following description of preferred embodiments.

Technical Solution

The above object is achieved by a laminated polyester film comprising a core layer and a sub-layer laminated on at least one surface of the core layer and containing first particles and second particles which are different components, wherein an average particle size of the first particles is 6 to 20 times an average particle size of the second particles.

Preferably, the laminated polyester film may have a haze of 1.0% or less and an internal haze of 0.2% or less.

Preferably, the laminated polyester film may have a peak count of a size of 18.75 nm or more and less than 31.25 nm being 1,000 to 10,000 pieces/μm², and a peak count of a size of 43.75 nm or more being less than 3,500 pieces/μm², more preferably a peak count of a size of 31.25 nm or more and less than 43.75 nm being 1,000 to 2,000 pieces/μm².

Preferably, when the laminated polyester film is run at 23° C. and 50% RH atmosphere, it may have a coefficient of dynamic friction with the hard coating of 0.5 to 2.0.

Preferably, a content ratio of the first particles and the second particles may satisfy the following Formula 1.

$$0.4 \leq \text{first particle content/second particle content} \leq 1.0 \quad \text{(Formula 1)}$$

Preferably, in the sub-layer, the first particles may be 0.03 to 0.08 wt %, and the second particles may be 0.08 to 0.2 wt %.

Preferably, an average particle size of the first particles may be 0.5 to 1.6 μm, and an average particle size of the second particles may be 0.06 to 0.3 μm.

More preferably, the average particle size of the first particles may be 0.8 to 1.2 μm, and the average particle size of the second particles may be 0.08 to 0.15 μm.

Preferably, the first particles may be calcium carbonate, and the second particles may be colloidal silica particles.

Preferably, a thickness ratio of the sub-layer and the core layer may be 1:4~40.

Preferably, a thickness of the laminated polyester film may be 5 to 300 μm.

In addition, the above object is achieved by a window film using the above-described laminated polyester film.

In addition, the above object is achieved by a release film for MLCC using the above-described laminated polyester film.

Advantageous Effects

The laminated polyester film according to the present disclosure can suppress particle visibility of particles visually recognized inside by transmitted light and/or reflected light such as sunlight, fluorescent lamp, three-wavelength or the like, by using inorganic particles having a refractive index similar to that of a polyester film in a certain ratio using a laminated structure.

In addition, the polyester film according to the present disclosure has excellent winding properties due to excellent friction properties even after processing, despite low roughness, by using particles with different components to improve dispersibility. In addition, excellent winding properties can be maintained even in contact with the functionally treated surface during winding.

In addition, the polyester film according to the present disclosure can be used as a release film for MLCC in which low roughness is desired to suppress pinhole occurrence during ceramic coating, and can be used as a material for securing high transparency of the window film attached to the exterior wall glass of vehicles and buildings to block harmful UV rays from the outside, to prevent glare from direct sunlight, and to reduce thermal energy.

In addition, the polyester film according to the present disclosure has effects such as solving the phenomenon that the image is blurred or not clear and the image is broken, not generating pinholes during MLCC coating, not generating collapse of the cross-sectional layer caused by lack of winding properties with functionally treated surfaces (hard coating surface, deposition surface, slurry surface) or winding defects recognized as air pockets, and thus not damaging the coating layer or the polyester film of the finished product.

However, the effects of the present disclosure may not be limited to the above-mentioned effects, and other effects of the present disclosure may be clearly understood to those skilled in the art from the following description.

MODE FOR INVENTION

Hereinafter, embodiments of the present disclosure will be described in detail with reference to the accompanying drawings so that those skilled in the art may easily practice the present disclosure. However, the present disclosure may be implemented in various different forms and is not limited to the embodiments provided in the present description.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Unless otherwise defined, all technical and scientific terms used herein have the same meaning as commonly understood by one of ordinary skill in the art to which this invention belongs. In case of conflict, the present specification, including definitions, will control. In addition, although methods and materials similar or equivalent to those described herein can be used in the practice or testing of embodiments of the present invention, suitable methods and materials are described below.

Hereinafter, preferred embodiments of the present disclosure will be described in more detail with reference to the accompanying drawings.

Figure 1:
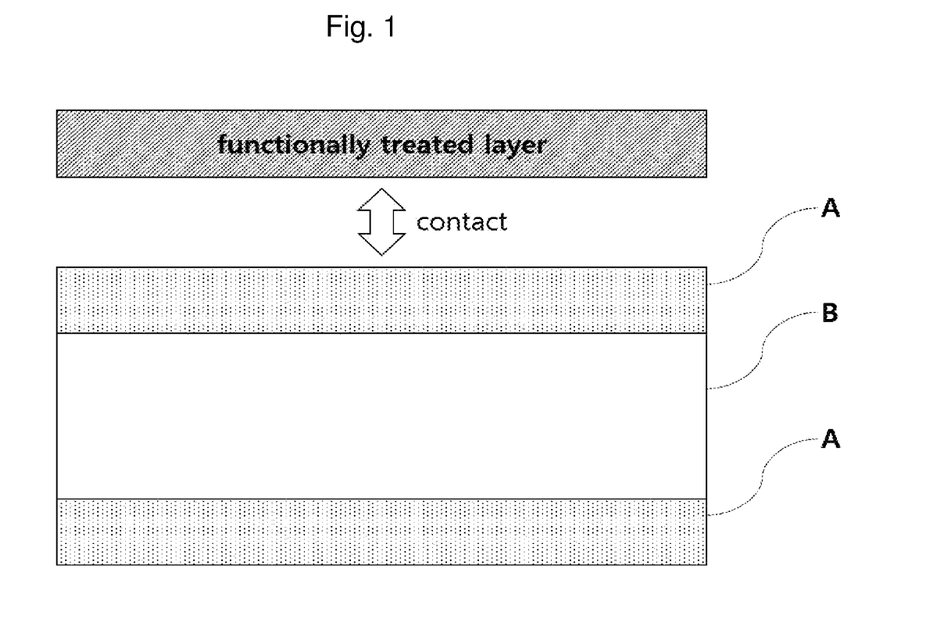
FIG. 1 is a cross-sectional view of a laminated polyester film according to an embodiment of the present disclosure.
Figure 2:
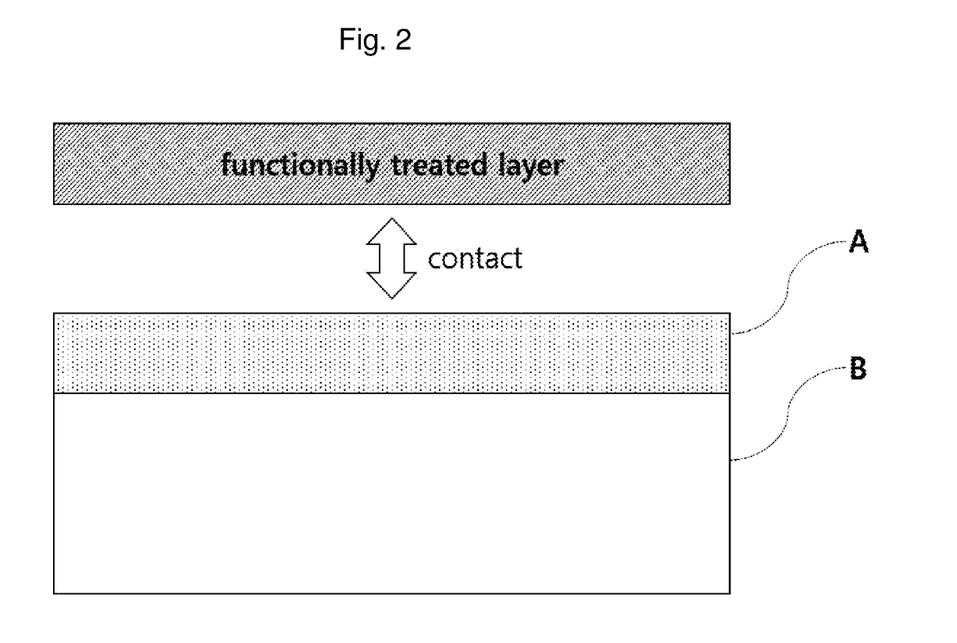
FIG. 2 is a cross-sectional view of a laminated polyester film according to another embodiment of the present disclosure.

FIG. 1 is a cross-sectional view of a laminated polyester film according to an embodiment of the present disclosure, and FIG. 2 is a cross-sectional view of a laminated polyester film according to another embodiment of the present disclosure.

Referring to FIGS. 1 and 2, the laminated polyester film according to an embodiment of the present disclosure includes a core layer B and a sub-layer A laminated on at least one surface of the core layer B. Here, FIG. 1 shows an example of a laminated polyester film in which a sub-layer A is formed on both surfaces of the core layer B, and FIG. 2 shows an example of a laminated polyester film in which a sub-layer A is formed only on the upper surface of the core layer B. In this way, the two- or three-layer laminated polyester film produced by a sequential biaxial stretching method has a structure in which a core layer B that does not contain fine particles and a sub-layer A that includes first particles and second particles different from each other are laminated.

In one embodiment, the sub-layer A includes amorphous first particles and second particles having a different composition from the first particles. When a polyester film is manufactured using only single inert particles of 1.0 μm to 2.0 μm, the number of protrusions on the surface of the polyester film is insufficient, resulting in poor winding properties after processing. In addition, when increasing the number of single inert particles to improve the poor winding properties, haze increases, making it difficult to implement a low haze product of 1.0% or less. Accordingly, for the implementation of low haze and improvement of poor winding properties, first particles and second particles having different components from each other are used together, and the average particle size of the first particles is set to be 6 to 20 times the average particle size of the second particles, so it is possible to achieve low haze and at the same time solve the poor winding properties.

In one embodiment, the average particle size of the first particles is preferably 0.5 to 1.6 μm. When the average particle size of the first particles is less than 0.5 μm, the friction coefficient is high and thus the winding property problem cannot be solved, and in the case of more than 1.6 μm, winding stability is increased, but aggregation of the first particles occurs inside the film, and the visibility of the first particles increases, thereby causing image blurring.

In addition, it is stable that the average particle size of the first particles is 0.5 to 1.6 μm, however since there is a possibility that the lower the average particle size, the lower the winding properties, the handling properties and the processability, and thus there is a possibility that the stability is not good in the mass production stage, more preferably, it may have an average particle size of 0.8 to 1.6 μm, and for high mass production stability and improved particle visibility, it is even more preferable to use the first particles having an average particle size of 1 μm. When the first particles have an average particle size of 0.8 to 1.2 μm, there is a possibility that winding defects may occur during PET winding, but in the present disclosure, the possibility of such winding defects can be prevented by using the second particles together.

In one embodiment, the average particle size of the second particle, which is a component different from the first particle, is preferably 0.06 to 0.3 μm, more preferably 0.08 to 0.15 μm. When the average particle size of the second particles is less than 0.06 μm, the winding properties is not sufficient, so there is a problem similar to the case of using only the first particles (defects such as air pockets, etc.), and in the case of more than 0.3 μm, as the particle size increases, the particles are visually recognized and thus image blurring occurs.

In one embodiment, the average particle size of the first particles is preferably 6 to 20 times the average particle size of the second particles. That is, it is preferable to use particles having an average particle size larger than that of the second particles as the first particles. In the present disclosure, particles having different components of the first particle and the second particle are used together to prevent aggregation, improve dispersibility, and induce protrusions of the particles, however when the average particle size of the first particles is less than 6 times the average particle size of the second particles, due to the small size of the first particles, when the protrusions are insufficient, there is a winding problem that is difficult to overcome with only the second particles. In addition, if it is more than 20 times, the van der Waals attraction increases, so that the aggregation-disrupting effect of the second particles having different components becomes insufficient, resulting in poor dispersibility, that is, the first particles and second particles adhere to each other, dispersion is not performed well, and protrusion is not performed properly. Accordingly, the effect of adding the second particles is reduced, so that not only the haze is increased due to aggregation, but also the problem that the particles do not protrude occurs. As such, in the present disclosure, it is characterized in that by configuring the average particle size of the first particles to be 6 to 20 times the average particle size of the second particles, the dispersion between the particles is made well and the protrusion of the particles is facilitated.

In one embodiment, the refractive index of the first particles is preferably 1.55 to 1.62. When the refractive index of the first particles is out of the range of 1.55 to 1.62, the difference is large from the polyester film having a refractive index of 1.64, so that there is a problem that the first particles, which are inert particles, are visually recognized. It is preferable to use calcium carbonate as the first particles having such a refractive index. The refractive index of calcium carbonate is 1.59, which is the most similar to that of a polyester film having a refractive index of 1.64 compared to an organic polymer having a refractive index of 1.57 or silica particles having a refractive index of 1.40, and compatibility and heat resistance are high, so the probability is low that the first particle, which is an inert amorphous particle, will be visually recognized in a film state. On the other hand, in the case of barium sulfate ($BaSO_4$), the refractive index is 1.64, but compatibility with PET is insufficient, and there is a high possibility that the occurrence of visible foreign objects (surface defects) such as fish eyes during PET stretching will increase, so it is not suitable for windows and MLCC films that require transparency and optical properties. In addition, in the case of the organic polymer, the heat resistance is low and there is a high possibility that it is carbonized in a melting line process and cause defects, so it is not preferable.

As described above, in the present disclosure, when the first particle is large, the haze becomes high, and the image blurring is also increased, and when the first particle is small, the roughness (protrusion) is low, and the winding properties is not good, so by using the second particles having different components, the dispersibility of the first particles is improved so that they are evenly spread on the surface to form protrusions. Since the size of the second particle is small, it does not affect haze increase, and through the effect of preventing the aggregation of the first particles having different components, the second particles are also well dispersed to form fine protrusions.

In the examples to be described later, colloidal silica capable of implementing a small average particle size is used as an example of the second particle, but the present invention is not limited thereto, and other inert particles having the refractive index of particles and average particle size described in the present disclosure may be used.

As such, in the laminated polyester film according to an embodiment of the present disclosure, the second particles mixed with the first particles have different components from the first particles, so there is no problem that the average particle size increases due to aggregation of particles between the first particle and the second particle or of each the first particles/second particles with each other of the first/second particles. Accordingly, it has effects such as the image blurring does not increase and the haze does not increase, and ceramic pinholes due to aggregation do not occur, and has the effect of making the particles protruding on the surface even, with good dispersibility, so that the degree of protrusion is uniform.

In one embodiment, a thickness ratio (A:B) of the sub-layer A and the core layer B is preferably 1:4~40, more preferably a thickness ratio of 5~30, and in terms of securing stability and winding stability in the mass production stage, a thickness ratio of 10~25 is even more preferable. When the thickness ratio of the core layer B to the sub-layer A is less than 4, there is a problem in that the haze increases, and when the haze increases, it becomes difficult to use as a window film. In addition, when the thickness ratio of the core layer B to the sub-layer A is more than 40, it is difficult to ensure winding stability. In the present disclosure, through such a thickness ratio of the sub-layer A and the core layer B, the number of protrusions of the laminated polyester film can be controlled.

In one embodiment, the content ratio of the first particles and the second particles included in the sub-layer A preferably satisfies Formula 1 below.

$$0.4 \leq \text{first particle content/second particle content} \leq 1.0 \quad \text{(Formula 1)}$$

When the value of Formula 1 is less than 0.4, due to the lack of the first particles, protruding properties (degree of protrusion) of the particles protruding from the surface decreases, resulting in poor processability, causing air pockets during winding, and there is a problem that aggregation of the second particles having a large surface area to volume occurs. In addition, when it is more than 1.0, since the first particles are excessive, there is a problem that haze increases and pinhole generation increases.

In addition, in the sub-layer A, it is preferable that the first particles is 0.03 to 0.08 wt %, and the second particles is 0.08 to 0.2 wt %. When the first particle is less than 0.03 wt %, there is a problem that air pockets are generated, and when it is more than 0.08 wt %, there is a problem that the haze increases. In addition, when the second particle is less than 0.08 wt %, there is a problem that the aggregation of the first particles increases, which causes image blurring, and due to the decrease in the protrusions protruding from the surface, winding properties (processability) is disadvantageous, so air pockets are generated, and when it is more than 0.2 wt %, there are problems such as cost increase, decrease in transmittance, and particle dropout.

In one embodiment, the core layer B does not contain inert particles and is formed of a polyester resin. In particular, the core layer B is preferably formed of the same polyester resin as the sub-layer A except that the inert particles (first particles, second particles) are not included. Of course, it may be formed of other polyester resins. In addition, as an example, it is preferable that the polyester resin which forms a sub-layer A and a core layer B is PET.

The laminated polyester film according to an embodiment of the present disclosure having such a configuration preferably has a haze of 1.0% or less, and an internal haze of 0.2% or less. When the haze exceeds 1.0%, there is a problem that image blurring increases, and when the internal haze exceeds 0.2%, the amount of particles that can be put into the A layer is reduced, so there is a problem that it is difficult to implement as many protrusions as desired on the film surface.

Meanwhile, the 'internal haze' described in this specification is a haze measured while blocking the scattering of light generated by the protrusions formed when particles in the film protrude to the surface during the stretching process of the film, and represents a haze measured by pure scattering only by the particles inside the film.

In addition, it is preferable that the laminated polyester film according to an embodiment of the present disclosure has a peak count of a size of 18.75 nm or more and less than 31.25 nm (small protrusions) being 1,000 to 10,000 pieces/$\mu m^2$, and a peak count of a size of 43.75 nm or more (large protrusions) being less than 3,500 pieces/$\mu m^2$. When the peak count of a size of 18.75 nm or more and less than 31.25 nm is less than 1,000 pieces/$\mu m^2$, due to the low number of protrusions, there is a problem that air pocket defects occurs due to a winding problem, and when it is more than 10,000 pieces/$\mu m^2$, there may be a problem that the image blurring increases, or when transporting/moving or rewinding the film, a sheet or part of the film protrudes sideways, that is, the cross-section falls out. In addition, when the peak count of a size of 43.75 nm or more is 3,500 pieces/$\mu m^2$ or more, there is a problem that the image blurring increases, or the cross-section may fall out, and the haze increases. That is, the more the total protrusions, the better the processing stability, but when there are many small protrusions exceeding the above range, there is a problem that image blurring increases, or when transporting/moving or rewinding the film, the cross-section falls out, and when the large protrusions exceed the above range, image blurring may increase or the cross-section may fall out, and the haze increases, so it is not preferable.

In one embodiment, it is preferable that a peak count of a size of 31.25 nm or more and less than 43.75 nm (medium protrusions) is 1,000 to 2,000 pieces/$\mu m^2$.

It is preferable that when the laminated polyester film according to an embodiment of the present disclosure is run at 23° C. and 50% RH atmosphere, the coefficient of dynamic friction with the hard coating is 0.5 to 2.0. When the friction coefficient is less than 0.5, SLIP property increases, which may cause a problem that the cross-section falls out, and when it exceeds 2.0, there is a problem that air pockets occur during winding.

The thickness of the laminated polyester film according to an embodiment of the present disclosure is preferably 5 to 300 µm, more preferably 10 to 250 µm. When the thickness of the film is less than 5 µm, the film is not supported, so there is a problem that it is difficult to attach the film to the window, and when it exceeds 300 µm, the film is too stiff, so there is a problem that it is difficult to respond to a curved shape when the film is attached to the window.

A manufacturing method of the laminated polyester film according to an embodiment of the present disclosure may include the steps of, through a polyester resin containing first particles and second particles and a polyester resin which does not contain inert particles, forming a sub-layer with the polyester resin containing the first particles and the second particles on at least one surface of a core layer, uniaxial stretching in a longitudinal direction, biaxial stretching in a transverse direction, heat setting and curing/drying.

At this time, it is preferable that in the steps of uniaxial stretching in a longitudinal direction and biaxial stretching in a transverse direction, a stretch ratio is 3.0 to 7.0 times. When the stretch ratio is less than 3.0, there is a problem that a defect occurs due to non-uniformity in stretching, and when it exceeds 7.0 times, there is a problem that a bowing phenomenon occurs.

In the step of heat setting, the biaxially stretched film is heat-treated at 190 to 220° C. to manufacture a biaxially stretched laminated polyester film. In particular, in the case of heat treatment, when the temperature is lower than 190° C., there is a risk of curling in a subsequent product processing step due to increased heat shrinkage, and when it exceeds 220° C., the bowing phenomenon becomes severe and a deviation of the optical axis may increase.

The laminated polyester film of the present disclosure according to the above-described content can be largely divided into a film for automobiles and a film for constructions depending on the uses, and can be used for window films (tinting films) used for reflective and non-reflective purposes depending on whether a deposition film is employed. In addition, it can be used as a base material or for a release purpose by coating a dye adhesive that gives a color to a highly transparent polyester film and adding a highly transparent hard coating to it to protect the surface of the product. In addition, the laminated polyester film of the present disclosure can be used as a base film for an MLCC release film, a process film, and a carrier film due to its high-transparency polyester characteristics. As such, the laminated polyester film of the present disclosure can solve the image blurring phenomenon by laminating a polyester resin and adjusting the types, heterogeneous characteristics, sizes and contents of inert particles contained in the resin as described above, and further improve the winding defects that occur during processing and winding of a final product, thereby increasing workability and perfection of a final product, and improving the defect rate.

Hereinafter, the present disclosure will be described in more detail through examples. These examples are intended to explain the present description in more detail, and the scope of the present disclosure is not limited to the examples.

EXAMPLES

Example 1

In the three-layer laminated polyester film manufactured by the sequential biaxial stretching method, a polyester resin layer (core layer) containing no fine particles was formed, and on both sides of the core layer, a polyester resin layer (sub-layer) containing amorphous calcium carbonate particles (first particles, average particle size of 1.0 µm) and colloidal silica (second particles, 0.09 µm) was formed. At this time, the content of calcium carbonate particles was 0.06 wt %, and the content of colloidal silica was 0.1 wt %. In addition, in order to adjust the thickness ratio of the core layer and the entire sub-layers, the thickness of the core layer was 21.6 µm, and the thickness of the entire sub-layers was 2.3 µm (the thickness of one sub-layer was 1.15 µm).

Example 2

A laminated polyester film was prepared in the same manner as in Example 1, except that the content of calcium carbonate particles was 0.07 wt %.

Example 3

A laminated polyester film was prepared in the same manner as in Example 1, except that the content of calcium carbonate particles was 0.04 wt %.

Example 4

A laminated polyester film was prepared in the same manner as in Example 1, except that the content of calcium carbonate particles was 0.08 wt % and the content of colloidal silica was 0.08 wt %.

Example 5

A laminated polyester film was prepared in the same manner as in Example 1, except that calcium carbonate particles having an average particle size of 1.6 μm and colloidal silica having an average particle size of 0.08 μm were used.

Example 6

A laminated polyester film was prepared in the same manner as in Example 1, except that calcium carbonate particles having an average particle size of 0.6 μm and colloidal silica having an average particle size of 0.08 μm were used.

COMPARATIVE EXAMPLES

Comparative Example 1

A laminated polyester film was prepared in the same manner as in Example 1, except that colloidal silica was not used.

Comparative Example 2

A laminated polyester film was prepared in the same manner as in Example 1, except that only 0.2 wt % of silica particles having an average particle size of 2.0 μm was used.

Comparative Example 3

A laminated polyester film was prepared in the same manner as in Example 1, except that 0.06 wt % of calcium carbonate particles having an average particle size of 1.0 μm and 0.1 wt % of calcium carbonate particles having an average particle size of 0.09 μm were used, and colloidal silica was not used.

Comparative Example 4

A laminated polyester film was prepared in the same manner as in Example 1, except that 0.06 wt % of silica particles having an average particle size of 1.0 μm and 0.1 wt % of colloidal silica particles having an average particle size of 0.09 μm were used, and no calcium carbonate particles were used.

Comparative Example 5

A laminated polyester film was prepared in the same manner as in Example 1, except that the content of calcium carbonate particles was 0.03 wt %.

Comparative Example 6

A laminated polyester film was prepared in the same manner as in Example 1, except that the content of calcium carbonate particles was 0.09 wt % and the content of colloidal silica was 0.08 wt %.

Comparative Example 7

A laminated polyester film was prepared in the same manner as in Example 1, except that calcium carbonate particles having an average particle size of 2.0 μm and colloidal silica having an average particle size of 0.09 μm were used.

Comparative Example 8

A laminated polyester film was prepared in the same manner as in Example 1, except that calcium carbonate particles having an average particle size of 0.4 μm and colloidal silica having an average particle size of 0.1 μm were used.

For the laminated polyester films prepared in Examples 1 to 6 and Comparative Examples 1 to 8, physical properties were evaluated through the following experimental examples, and the results are shown in Tables 1 to 3.

Experimental Examples (1) Haze Measurement

The haze was measured using a HAZE measuring instrument (NDH 4000) manufactured by NIPPON DENSHOKU INDUSTRIES Co., LTD.

(2) Internal Haze Measurement

The internal haze was measured according to JIS K7136 using a haze meter (NDH 4000).

(3) Peak Count Measurement

The peak count was measured using SE3500K equipment (product name of KOSAKA Laboratory Ltd.). At this time, a peak count of a size of 18.75 nm or more and less than 31.25 nm, a peak count of a size of 31.25 nm or more and less than 43.75 nm, and a peak count of a size of 43.75 nm or more were separately measured.

(4) Friction Coefficient Measurement

Using 14FW equipment (product name of HEIDON company), the dynamic friction coefficient when the film was brought into contact with a hard coating (TAK) (a hard coating manufactured by EASTMAN company) and run under an atmosphere of 23° C. and 50% RH was measured.

(5) Image Blurring Evaluation

Image blurring was evaluated by cutting the prepared film in A4 size and putting it on one polarizing plate film, laminating another polarizing plate film on the prepared film, observing through cross nicol, and counting the number of fish eyes. At this time, the fish eyes of less than 20 μm were not counted, and the evaluation criteria are as follows.

| ⊚: very good | 2 or less pieces/A4 |
|---|---|
| Δ: normal | 3~5 pieces/A4 |
| X: bad | 6 or more pieces/A4 |

(6) Processing Stability Evaluation

Processing stability was evaluated by configuring the film surface prepared in Examples and Comparative Examples as shown in FIG. 1 (hard coating and winding (EASTMAN company)), collecting in A4 size, and counting the number of air pockets in A4 with a fluorescent light reflective light source. In this case, the evaluation criteria are as follows.

| ⊚: very good | 0 or less pieces/A4 |
| Δ: normal | 1~5 pieces/A4 |
| X: bad | 6 or more pieces/A4 |

(7) Evaluation of Pinhole Occurrence

A release layer with a thickness of 0.06 μm is formed by coating an addition reaction type silicone release composition (Shin-Etsu company, KS-839L) and a platinum catalyst mixed solution with a concentration of 5000 ppm (Shin-Etsu company, PL=50T) on one side of the prepared films of the Examples and Comparative Examples with a Mayer bar (cheminstruments company, #12 mesh), and then heat curing at 180° C. for 1 minute using a hot air dryer. Then, a ceramic slurry is prepared by mixing 100 g of barium titanate particles having an average particle size of 0.2 μm, 10 g of polyvinyl butyral, 8 g of toluene and 2 g of butanol, stirring at room temperature for 12 hours, and then ball milling at 500 rpm for 24 hours. Then, by coating this on the release layer of each Example and Comparative Example using an applicator and then drying with hot air at 80° C. for 1 minute, a ceramic sheet having a thickness of 1 μm was formed. Then, it was observed with an interferometric microscope, and the number of pinholes exceeding 10 μm per A4 size was recorded and evaluated as follows.

| ⊚: very good | 0~1 pieces/A4 |
| ◯: good | 2~3 pieces/A4 |
| Δ: normal | 4~5 pieces/A4 |
| X: bad | 6~7 pieces/A4 |
| XX: Very bad | 8 or more pieces/A4 |

TABLE 1

| Item | Example 1 | Example 2 | Example 3 | Example 4 | Example 5 | Example 6 |
| --- | --- | --- | --- | --- | --- | --- |
| first particle content (wt %) | 0.06 | 0.07 | 0.04 | 0.08 | 0.06 | 0.06 |
| second particle content (wt %) | 0.1 | 0.1 | 0.1 | 0.08 | 0.1 | 0.1 |
| first particle/second particle content ratio | 0.6 | 0.7 | 0.4 | 1.0 | 0.6 | 0.6 |
| first particle average particle size (μm) | 1.0 | 1.0 | 1.0 | 1.0 | 1.6 | 0.6 |
| second particle average particle size (μm) | 0.09 | 0.09 | 0.09 | 0.09 | 0.08 | 0.08 |
| first particle average particle size/second particle average particle size | 11 | 11 | 11 | 11 | 20 | 7.5 |
| first particle | calcium carbonate | calcium carbonate | calcium carbonate | calcium carbonate | calcium carbonate | calcium carbonate |
| second particle | colloidal silica | colloidal silica | colloidal silica | colloidal silica | colloidal silica | colloidal silica |
| haze | 0.8 | 0.8 | 0.6 | 1.0 | 0.8 | 0.8 |
| internal haze | 0.2 | 0.2 | 0.2 | 0.2 | 0.2 | 0.2 |
| peak count greater than 43.75 nm (pieces/μm²) | 1223 | 2307 | 821 | 3321 | 3283 | 2800 |
| peak count of 31.25 nm or more and less than 43.75 nm (pieces/μm²) | 1254 | 1580 | 1052 | 1657 | 1523 | 1320 |
| peak count of 18.75 nm or more and less than 31.25 nm (pieces/μm²) | 5485 | 3000 | 2765 | 8956 | 6880 | 3751 |
| friction coefficient with a hard coating (μk) | 1.4 | 1.2 | 1.8 | 0.7 | 1.5 | 1.7 |
| image blurring | ⊚ | ⊚ | ⊚ | ⊚ | ⊚ | ⊚ |
| processing stability | ⊚ | ⊚ | ⊚ | ⊚ | ⊚ | ⊚ |
| pinhole occurrence | ⊚ | ⊚ | ⊚ | ⊚ | ⊚ | ⊚ |

As can be seen in Table 1 above, the laminated polyester film according to an embodiment of the present disclosure has a haze of 1.0% or less, a peak count of a size of 18.75 nm or more and less than 31.25 nm (small protrusions) being 1,000 to 10,000 pieces/μm², a peak count of a size of 43.75 nm or more (large protrusions) being less than 3,500 pieces/μm², and a peak count of a size of 31.25 nm or more and less than 43.75 nm (medium protrusions) being 1,000 to 2,000 pieces/μm², so it has excellent image blurring and processing stability, and does not generate pinholes.

TABLE 2

| Item | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| first particle content (wt %) | 0.06 | 0.2 | 0.06 | 0.06 | 0.03 | 0.09 | 0.06 | 0.06 |
| second particle content (wt %) | — | — | 0.1 | 0.1 | 0.1 | 0.08 | 0.1 | 0.1 |
| first particle/second particle content ratio | — | — | 0.6 | 0.6 | 0.3 | 1.1 | 0.6 | 0.6 |
| first particle average particle size (μm) | 1.0 | 2.0 | 1.0 | 1.0 | 1.0 | 1.0 | 2.0 | 0.4 |
| second particle average particle size (μm) | — | — | 0.09 | 0.09 | 0.09 | 0.09 | 0.09 | 0.1 |
| first particle average particle size/second particle average particle size | — | — | 11 | 11 | 11 | 11 | 22 | 4 |
| first particle | calcium carbonate | silica | calcium carbonate | silica | calcium carbonate | calcium carbonate | calcium carbonate | calcium carbonate |
| second particle | — | — | calcium carbonate | colloidal silica | colloidal silica | colloidal silica | colloidal silica | colloidal silica |
| haze | 0.8 | 2.8 | 1.2 | 0.8 | 0.3 | 1.2 | 1.5 | 0.6 |
| internal haze | 0.2 | 0.2 | 0.2 | 0.2 | 0.2 | 0.2 | 0.2 | 0.2 |
| peak count greater than 43.75 nm (pieces/μm$^2$) | 502 | 4577 | 678 | 732 | 632 | 2800 | 2354 | 328 |
| peak count of 31.25 nm or more and less than 43.75 nm | 125 | 1254 | 877 | 838 | 328 | 951 | 977 | 87 |
| peak count of 18.75 nm or more and less than 31.25 nm (pieces/μm$^2$) | 658 | 408 | 879 | 720 | 831 | 924 | 767 | 378 |
| friction coefficient with a hard coating (μk) | 3.8 | 1.7 | 2.4 | 2.4 | 2.6 | 2.1 | 2.2 | 3.7 |
| image blurring | ◎ | X | X | X | ◎ | ◎ | X | ◎ |
| processing stability | X | ◎ | X | X | X | X | ◎ | X |
| pinhole occurrence | ◎ | XX | Δ | ◎ | ◎ | ◎ | XX | Δ |

On the other hand, it can be seen that Comparative Example 1, which does not use the second particles having a small average particle size, has a high friction coefficient with a hard coating (TAK), so processing stability is poor. In addition, it can be seen that Comparative Example 2, using only the first particles having a larger average particle size than in Example 1, has many large protrusions and thus has excellent processing stability, but the haze exceeds 1.0%, so the image blurring is increased, and pinholes occur.

In addition, in Comparative Example 3 using calcium carbonate as both the first particle and the second particle, it can be seen that the image blurring is increased due to the aggregation between the same particles, processing stability is also deteriorated due to the low number of protrusions formed on the surface, and pinholes occur.

In addition, in Comparative Example 4 using silica as both the first particle and the second particle, it can be seen that since they are the same components, the image blurring is increased due to aggregation between particles, and dispersibility between particles is lowered due to the same components, so that the friction coefficient exceeds 2.0 and processing stability is also deteriorated.

In addition, it can be seen that Comparative Example 5, in which the content ratio of the first particles to the second particles is less than 0.4, has poor processing stability due to the low number of protrusions.

In addition, in Comparative Example 6, in which the content ratio of the first particles to the second particles is greater than 1.0, it can be seen that the haze increases, and since the content of the second particles is insufficient to prevent the aggregation of the first particles (large particles), the size of the large protrusions is increased compared to Example 4, but the number is decreased, and the number of medium protrusions and small protrusions is also reduced, resulting in poor winding properties and poor processing stability.

In addition, in Comparative Example 7, in which the average particle size of the first particles exceeds 1.6 μm and the average particle size ratio exceeds 20 times, it can be seen that due to the calcium carbonate having large particle size, the medium protrusions and small protrusions are reduced compared to the large protrusions, so there is processing stability under the influence of large protrusions, but aggregation of particles occurs, so haze increases, image blurring increases, and pinholes occur.

In addition, in Comparative Example 8, in which the average particle size of the first particles is less than 0.5 μm and the average particle size ratio is less than 6 times, it can be seen that due to the low number of surface protrusions, processing stability is poor, winding property is also poor, and pinholes occur.

Although the preferred embodiments of the present disclosure have been described above in detail, the scope of the present disclosure is not limited thereto. Those skilled in the art will appreciate that various modifications and improvements are possible, without departing from the basic concept of the present disclosure as defined in the appended claims, and also fall within the scope of the present disclosure.

DESCRIPTION OF REFERENCE NUMERALS/MARKS

A: sub-layer
B: core layer

The invention claimed is:

1. A laminated polyester film comprising:
a core layer; and
a sub-layer laminated on at least one surface of the core layer and containing first particles and second particles having different components from each other,
wherein an average particle size of the first particles is 6 to 20 times an average particle size of the second particles,
wherein the first particles are calcium carbonate and the second particles are colloidal silica particles, and
wherein, in the sub-layer, a content of the first particles ranges from 0.03 to 0.08 wt %, which is equal to or less than a content of the second particles which ranges from 0.08 to 0.2 wt %, such that a content ratio of the first particles to the second particles ranges from 0.4 to 1.0.

2. The laminated polyester film according to claim 1, wherein the laminated polyester film has a haze of 1.0% or less, and an internal haze of 0.2% or less.

3. The laminated polyester film according to claim 1, wherein the laminated polyester film has a peak count of a size of 18.75 nm or more and less than 31.25 nm being 1,000 to 10,000 pieces/μm$^2$, and a peak count of a size of 43.75 nm or more being less than 3,500 pieces/μm$^2$.

4. The laminated polyester film according to claim 1, wherein the laminated polyester film has a peak count of a size of 31.25 nm or more and less than 43.75 nm being 1,000 to 2,000 pieces/μm$^2$.

5. The laminated polyester film according to claim 1, wherein when the laminated polyester film is run at 23° C. and 50% RH atmosphere, the laminated polyester film has a coefficient of dynamic friction with a hard coating of 0.5 to 2.0.

6. The laminated polyester film according to claim 1, wherein the average particle size of the first particles is from 0.5 to 1.6 μm and the average particle size of the second particles is from 0.06 to 0.3 μm.

7. The laminated polyester film according to claim 6, wherein the average particle size of the first particles is from 0.8 to 1.2 μm and the average particle size of the second particles is from 0.08 to 0.15 μm.

8. The laminated polyester film according to claim 1, wherein a thickness ratio of the sub-layer and the core layer is 1:4 to 40.

9. The laminated polyester film according to claim 1, wherein a thickness of the laminated polyester film is 5 to 300 μm.

10. A window film using a laminated polyester film, the laminated polyester film comprising:
a core layer; and
a sub-layer laminated on at least one surface of the core layer and containing first particles and second particles having different components from each other,
wherein an average particle size of the first particles is 6 to 20 times an average particle size of the second particles,
wherein the first particles are calcium carbonate and the second particles are colloidal silica particles, and
wherein, in the sub-layer, a content of the first particles ranges from 0.03 to 0.08 wt %, which is equal to or less than a content of the second particles which ranges from 0.08 to 0.2 wt %, such that a content ratio of the first particles to the second particles ranges from 0.4 to 1.0.

11. A release film for multilayer ceramic capacitor (MLCC) using a laminated polyester film, the laminated polyester film comprising:
a core layer; and
a sub-layer laminated on at least one surface of the core layer and containing first particles and second particles having different components from each other,
wherein an average particle size of the first particles is 6 to 20 times an average particle size of the second particles,
wherein the first particles are calcium carbonate and the second particles are colloidal silica particles, and
wherein, in the sub-layer, a content of the first particles ranges from 0.03 to 0.08 wt %, which is equal to or less than a content of the second particles which ranges from 0.08 to 0.2 wt %, such that a content ratio of the first particles to the second particles ranges from 0.4 to 1.0.

* * * * *